United States Patent [19]
Schoendube

[11] 3,732,486
[45] May 8, 1973

[54] ELECTRICAL APPARATUS WITH THYRISTOR CIRCUIT

[75] Inventor: Charles W. Schoendube, Lee, Mass.

[73] Assignee: General Electric Company

[22] Filed: Dec. 29, 1971

[21] Appl. No.: 213,338

[52] U.S. Cl. .................323/43.5 S, 323/45, 323/62
[51] Int. Cl. ...............................................G05f 1/20
[58] Field of Search........................323/6, 43.5 S, 45, 323/62, 25

[56] References Cited

UNITED STATES PATENTS

| | | | |
|---|---|---|---|
| 3,600,664 | 8/1971 | Goldberg et al. | 323/43.5 S |
| 3,275,929 | 9/1966 | Schatz | 323/43.5 S |
| 1,914,193 | 6/1933 | Bedford | 323/43.5 S |
| 1,959,153 | 5/1934 | Blume | 323/45 |
| 3,195,038 | 7/1965 | Fry | 323/43.5 S |

Primary Examiner—A. D. Pellinen
Attorney—Francis X. Doyle et al.

[57] ABSTRACT

Voltage regulator apparatus for an alternating current electrical system which includes a secondary of a transformer connected in series with the line. A voltage of either polarity or no voltage is applied to the primary of the transformer through a plurality of pairs of inverse parallel connected thyristors. The thyristors are gated in an order to assure commutation of any prior conducting thyristor.

6 Claims, 6 Drawing Figures

Inventor,
Charles W. Schoendube,
by Francis X. Doyle
His Attorney.

Inventor,
Charles W. Schoendube,
by Francis X. Doyle
His Attorney.

3,732,486

ELECTRICAL APPARATUS WITH THYRISTOR CIRCUIT

BACKGROUND OF THE INVENTION

1. Field of the Invention

This invention relates to voltage regulators used for regulating voltage in alternating current electrical systems. More particularly, it relates to voltage regulators which utilize phase controlled thyristor switching devices to supply a voltage which bucks, boosts, or leaves unchanged the line or supply voltage to the regulator so as to maintain a steady output voltage level in spite of variations in the line or supply voltage.

At present, the cost of high current carrying thyristors or controlled rectifiers is relatively high. A thyristor or controlled rectifier connected directly in the line supply voltage would require a relatively high current rating to supply medium power ratings of up to approximately 800 KVA at low commercial voltages in the range of 120 to 480 volts. Therefore, it is highly desirable to have a simple, efficient, and economical voltage regulator system in which the thyristors or controlled rectifiers need not be capable of carrying full line or load current.

2. DESCRIPTION OF THE PRIOR ART

Voltage regulators in which a secondary winding of a transformer is connected in series with the AC line are known in the prior art. The primary winding of this type of transformer is connected to a source of unregulated voltage and gated bilateral semiconductor switches selectively connect such primary to provide bucking or boosting voltage increments to the secondary.

SUMMARY OF THE INVENTION

Briefly, the present invention is an alternating current regulator system in which the secondary winding of a transformer is connected in series with a line and load circuits. Various magnitudes and polarities of an alternating voltage or potential are applied to the primary winding of the transformer generally from a supply or shunt transformer by selection of one or more of a plurality of pairs of inverse parallel connected thyristors or controlled rectifiers, connected to the shunt transformer.

In one embodiment, one of a plurality of magnitudes of alternating potential may be selected through one of a plurality of sets of thyristors and applied to one terminal of the primary winding of the transformer. The other terminal of the primary winding of the transformer is connected to a potential of median magnitude. The plurality of magnitudes of alternating current may be produced in one embodiment, by connecting a shunt transformer having a plurality of taps across the alternating current line. In two other embodiments shunt transformers are used to provide the same amount of power regulation to a high voltage-low current system or to a low voltage-high current system.

In other embodiments, the primary winding of the transformer is connected between various combination of inverse parallel connected pairs of thyristors. An inverse parallel connected pair of thyristors is also connected across the primary winding of the transformer. Various degrees of buck or boost are provided by triggering various combinations of these inverse parallel connected pairs of thyristors or sets of thyristors in order to provide current flow through the primary winding of the transformer in the desired boost or buck direction. The set of thyristors connected across the primary winding of the transformer may be triggered to short the primary winding, the transformer thereby producing a zero buck or boost condition.

In these embodiments, triggering of the thyristors is always in an order or sequence to provide automatic commutation of any previously conducting thyristor. For example, in the case of the embodiment using a shunt transformer having a plurality of taps for producing a plurality of magnitudes of alternating potential, the triggering sequence is always from a set of thyristors connected to a lower potential to a set of thyristors connected to a higher potential.

The use of thyristors, copper, and iron in the regulator is optimized because the thyristors are not required to carry full load current but need to be rated only for a current depending upon the degree of regulation required. Furthermore, the requirements for copper and iron are minimized because the primary winding of the transformer need not be rated to carry load current.

BRIEF DESCRIPTION OF THE DRAWINGS

While the specification concludes with claims particularly pointing out and distinctly claiming the subject matter which is regarded as the invention, it is believed the invention will be better understood from the following description of preferred embodiments taken in connection with accompanying drawings, in which:

DESCRIPTION OF THE PREFERRED EMBODIMENTS

Figure 1:
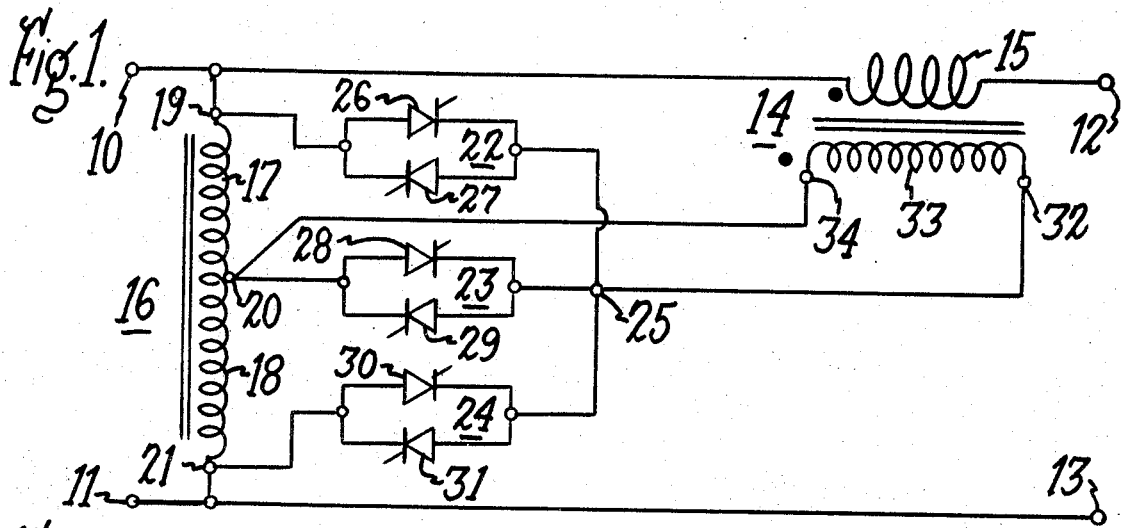
FIG. 1 is a schematic diagram of a circuit illustrating the principles of the invention.

Referring now to the drawings, and more particularly to FIG. 1, there is shown a schematic diagram of a regulator switching arrangement in accordance with the teachings of the invention. The circuitry for triggering the thyristors or controlled rectifiers are well known in the art and are not shown since they form no part of this invention.

Terminals 10 and 11 are input terminals across which a source of alternating voltage is applied. A load requiring the regulated alternating voltage is connected across terminals 12 and 13. The secondary winding 15 of a transformer 14 is connected in series with one side of the line, between terminals 10 and 12.

A shunt or supply transformer 16, comprised of windings 17 and 18 and having taps 19, 20 and 21, is connected across the input terminals 10 and 11. Thyristor set 22 or inverse parallel connected pair of thyristors 26 and 27 is connected between tap 19 and point 25. Thyristor set 23 or inverse parallel connected pair of thyristors 28 and 29 is connected between center or median tap 20 and point 25. Thyristor set 24 or inverse parallel connected pair of thyristors 30 and 31 is connected between tap 21 and point 25. Thus one side of each of the thyristor sets 22–24 are connected together at point 25 which in turn is connected to terminal 32 of primary winding 33 of transformer 14. Terminal 34 of primary winding 33 is connected to center or median tapped 20 of shunt transformer 16. It may be noted that the dot convention is used on transformer 14 and all other transformers in this disclosure in order to aid in understanding of their operation. For example, in the case of transformer 14, a positive current flow into dotted terminal 34 of primary winding 33 would create a positive potential on terminal 34 with respect to terminal 32. This in turn would cause a positive potential at the dotted terminal of secondary winding 15 with respect to the other end of secondary winding 15.

Figure 2:
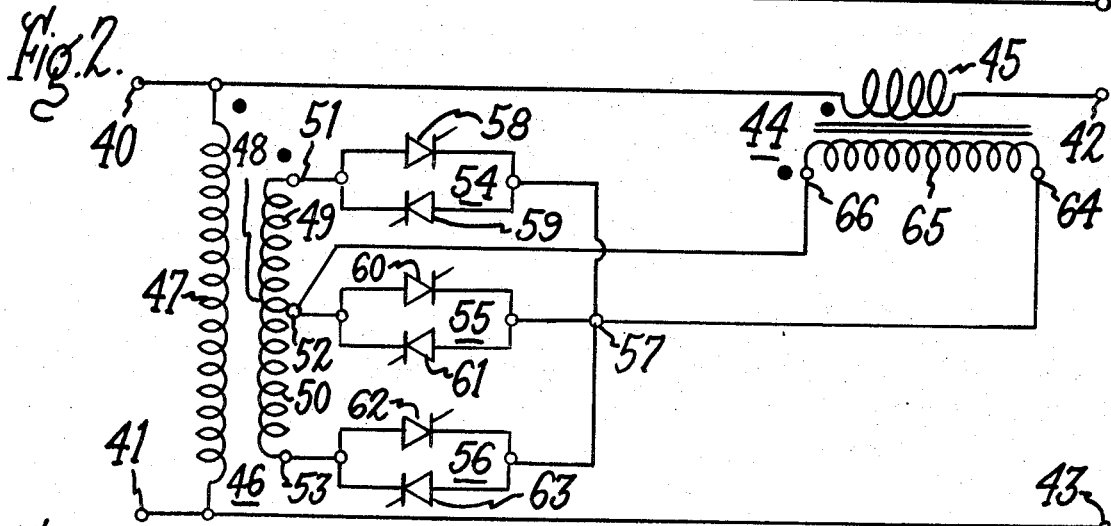
FIG. 2 is a schematic diagram of a modification of the circuit shown in FIG. 1 which will supply the same amount of power regulation as the circuit of FIG. 1 in a high voltage-low current system.

Referring now to FIG. 2, wherein an alternate embodiment is shown, terminals 40 and 41 are input terminals across which a source of alternating voltage is applied. The load requiring the regulated alternating voltage is connected across terminals 42 and 43. Secondary windings 45 of transformer 44 is connected in series with the line between terminals 40 and 42.

The primary winding 47 of step down transformer 46 is connected in shunt across the input terminals 40 and 41. The secondary winding 48 of transformer 46 is comprised of windings 49 and 50 and is provided with taps 51, 52 and 53. Thyristor set 54, comprised of inverse parallel connected thyristors 58 and 59, is connected between tap 51 and point 57. Thyristor set 55, comprised of inverse parallel connected thyristors 60 and 61, is connected between 52 and point 57. Thyristor set 56, comprised of thyristor 62 and 63 is connected between tap 53 and point 57. Thus one side of each of the thyristor sets 54–56 is connected to point 57 which is in turn connected to terminal 64 of primary winding 65 of transformer 44. Terminal 66 of primary winding 65 is connected to center tap or median point 52 of secondary winding 48 of transformer 46.

Figure 3:
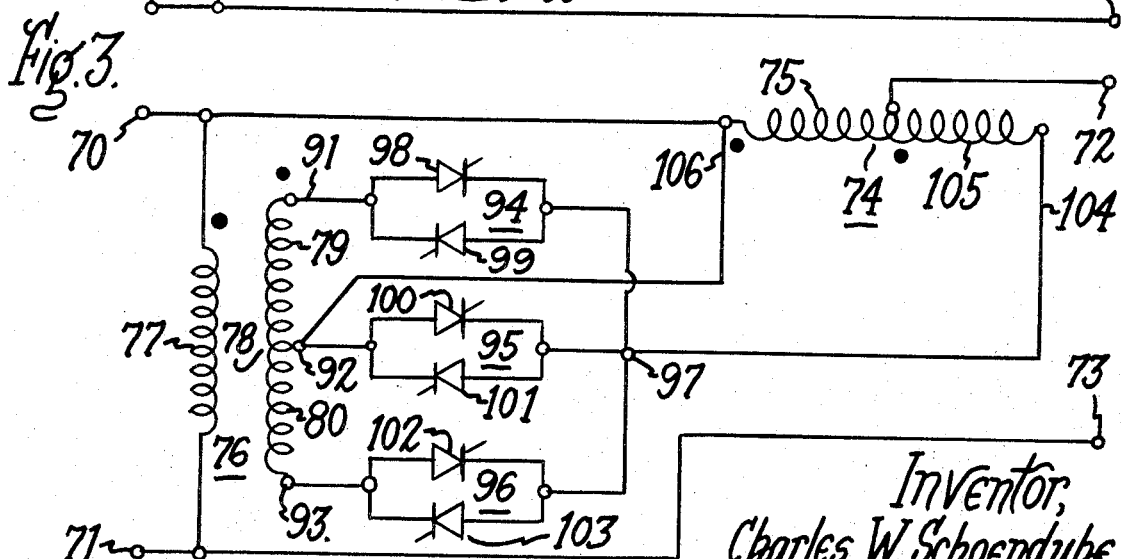
FIG. 3 is a modification of the circuit shown in FIG. 1 which will supply the same amount of power regulation to a low voltage-high current system.

Referring now to FIG. 3, wherein a further embodiment of the invention is shown, terminals 70 and 71 are input terminals across which a source of alternating voltage is applied. The load requiring the regulated alternating voltage is connected across terminals 72 and 73. A winding 75 of an autotransformer 74 is connected in series with the line between terminals 70 and 72.

Primary winding 77 of step-up transformer 76 is connected in shunt across input terminals 70 and 71. Secondary winding 78 of step-up transformer 76 is comprised of windings 79 and 80 and is provided with taps 91, 92 and 93. Step-up transformer 76 and autotransformer 74 enable the circuit to be used as a regulator in a low voltage high current system. Thyristor set 94, comprised of thyristors 98 and 99, is connected between tap 91 and point 97. Thyristor set 95, comprised of thyristors 100 and 101, is connected between center or median tap 92 and point 97. Thyristor set 96, comprised of thyristors 102 and 103, is connected between tap 93 and point 97. Thus one side of each of the thyristor sets 94–96 are connected together at point 97 and are in turn connected to terminal 104 of winding 105 of autotransformer 74. Terminal 106 of transformer 74 is connected to the center tap or median point 92 of the secondary winding 78 of transformer 76.

Figure 4:
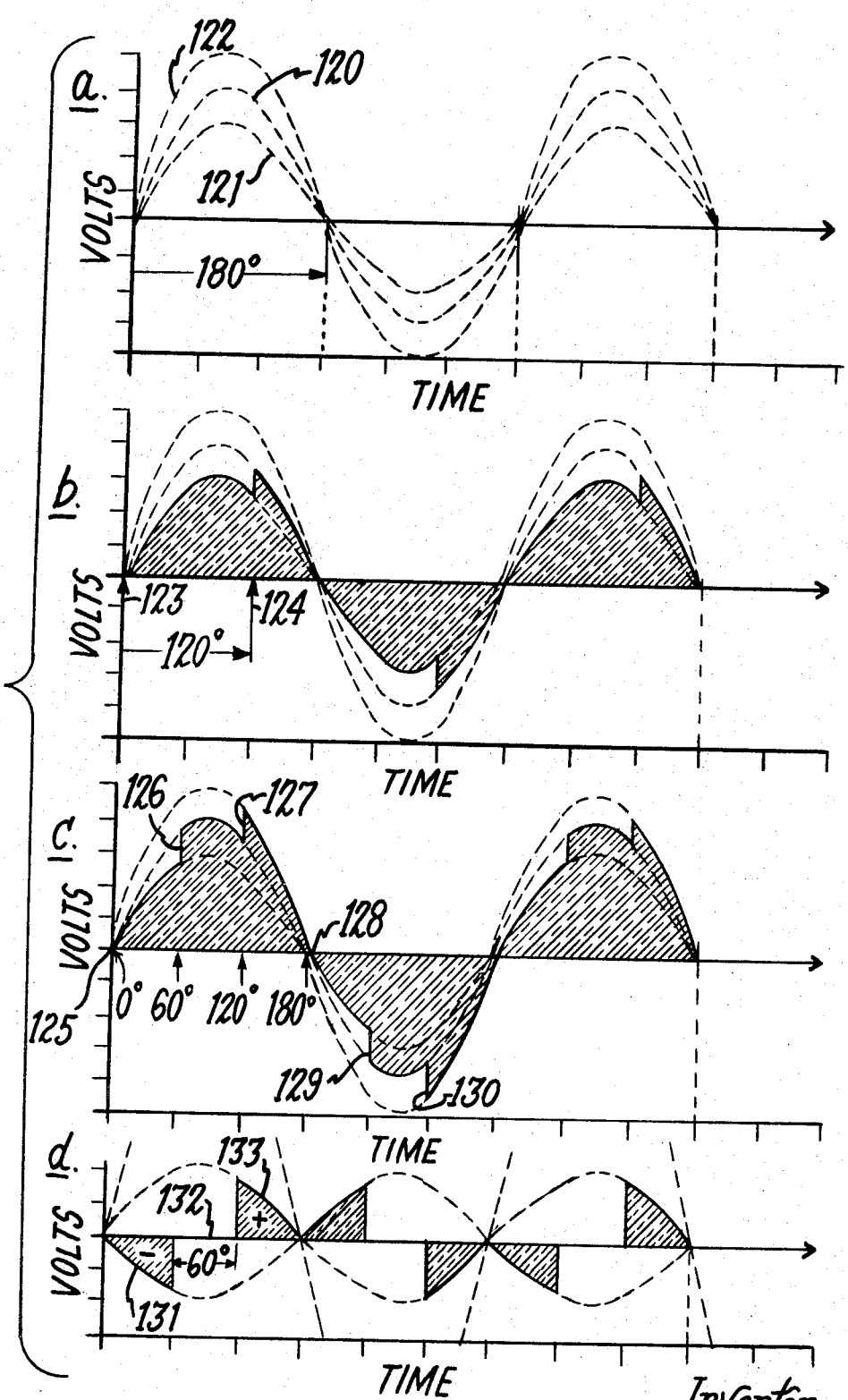
FIG. 4 is a drawing of various electrical wave forms used in describing the operation of the circuits.

Referring now to FIG. 4, there is shown typical various wave forms at selected points in the circuits. All of the wave forms are drawn on a coordinate system having an abscissa axis representing time and an ordinate axis representing voltage. The wave forms in FIG. 4a, b and c represent the output regulated voltage during various conducting conditions of the thyristors. FIG. 4d is a drawing representation of the voltage applied to the primary winding of the series transformer, for example transformer 14 of FIG. 1. It is to be understood that the differences between voltage levels produced by triggering thyristors in different thyristor sets is exaggerated for the purposes of illustration. Smaller differences between voltage levels would produce a lesser amount of harmonics.

FIG. 4a shows three sine wave forms. Wave form 120 represents the output voltage of the regulator circuit when no buck or boost is applied. Referring to FIG. 1, wave form 120 would be generated if the proper thyristor for each half cycle of thyristor set 23 were triggered. Triggering of the proper thyristor of thyristor set 23 would produce a short circuit across the primary winding 33 of transformer 14 thereby inducing no voltage in secondary winding 15.

Referring now again to FIG. 4a, wave form 121 represents the output electrical wave form during the maximum buck condition. Referring to FIG. 1, wave form 121 would be generated across output terminals 12 and 13 if the proper thyristor of thyristor set 24 were conductive during each half cycle. Wave form 122 represents the output regulated voltage for a maximum boost condition. Wave form 122 would be generated across terminals 12 and 13 of FIG. 1 if the proper thyristor of thyristor set 22 were gated during each half cycle.

The solid line wave form shown in FIG. 4b represents a condition wherein the proper thyristor of thyristor set 24 is triggered immediately after the zero crossing and the proper thyristor of thyristor set 23 is triggered at 120° after the zero crossing. The R.M.S. output voltage of the regulator system in the case of FIG. 4b would correspond to a buck condition between zero and maximum buck.

The solid line wave form in FIG. 4c represents the output voltage across terminals 12 and 13 of FIG. 1 wherein the proper thyristor of thyristor set 24 is triggered immediately after the zero crossing, the proper thyristor of thyristor set 23 is fired 60° after the zero crossing and the proper thyristor of thyristor set 22 is fired 120° after each zero crossing. The solid line wave forms of FIG. 4d represent the voltage or current flowing in primary winding 33 of transformer 14 of FIG. 1 in order to produce regulated output voltage of FIG. 4c.

In operation of the embodiment of FIG. 1, an alternating current supply is connected across terminals 10 and 11 and a load is connected across terminals 12 and 13. Transformer 14 may, for example, have a primary 33 to secondary 15 turns ratio of 3:1. Thus, with an alternating current supply connected across input terminals 10 and 11 and a load connected across terminals 12 and 13, a voltage is impressed across the primary winding 33 of transformer 14 equal to three times the voltage across secondary winding 15. In operation, a suitable triggering circuit is provided to trigger appropriate thyristors of sets 22–24 in the sequency of 24,23,22. On a positive half cycle, a positive potential is felt on the dotted terminals of secondary winding 15 and primary winding 33 of transformer 14 with respect to the other end of the windings, respectively. The positive potential on terminal 34 of primary winding 33 is applied through tap 20 and winding 18 of shunt transformer 16 and to the anode of thyristor 30 of thyristor set 24. One of the thyristors of thyristor set 24 is gated shortly after every zero crossing of the voltage applied across terminals 10 and 11. In the case of the positive half cycle, thyristor 30 of thyristor set 24 is gated or triggered shortly after the positive going zero crossing. On the positive half cycle, it is noted that taps 19 and 20 of shunt transformer 16 are positive with respect to tap 21. Therefore, it is noted that the voltage from taps 20 to 21 across winding 18 of shunt transformer 16 subtracts from the voltage across primary winding 33 when added algebraically in a closed loop. That is, by starting at terminal 32 of primary winding 33 and going to terminal 34, a positive voltage equal to 3 times the voltage across the secondary winding 15 is encountered. By continuing around the closed path and passing through winding 18 from terminal 20 to terminal 21 a negative voltage is encountered which subtracts from the voltage across primary winding 33. Thus, this difference voltage is applied across the thyristor 30 in the proper polarity to turn on of thyristor 30 when it is gated. When thyristor 30 conducts, the positive voltage through tap 21 to 20 is applied to winding 33 of transformer 14. The voltage appearing at winding 15 is positive at the dotted end and hence opposed to the voltage at terminal 10. Thus only thyristor 30 is conducting during the entire positive half cycle, a voltage wave form 121 as shown in FIG. 4a will be generated.

However, if thyristor 28 is gated or triggered at a time equal to 120 electrical degrees after the zero crossing of the input wave form, a short circuit will be applied across primary winding 33. The turning on of thyristor 28 also causes the negative to positive voltage from terminal 21 to terminal 20 of winding 18 to be applied across the cathode to anode terminals of thyristor 30 thereby commutating or turning off thyristor 30. The wave form generated in such a case would be that shown by the solid line wave form in FIG. 4b. In FIG. 4b, thyristor 30 was gated at a time indicated as point 123 and thyristor 28 was gated at a time indicated as point 124. As shown in FIG. 4b, the firing times between thyristor 30 and thyristor 28 are 120 electrical degrees apart, however, it is understood that firing times may be separated by a larger or smaller number of electrical degrees depending upon the desired or required effective or R.M.S. voltage output. As an example of where all three thyristors 30, 28 and 26 are fired on a positive half cycle, assume that it is desired to fire thyristor 30 at approximately zero electrical degrees, and thyristor 28 at approximately 60 electrical degrees, and thyristor 26 at 120 electrical degrees. In such a case, thyristors 30 and 28 would be fired at zero degrees and 60 degrees, respectively, and the circuit would operate as described above. Assuming that thyristor 28 is now conducting during the interval between 60 degrees and 120 degrees and a triggering pulse is applied to thyristor 26 at 120 electrical degrees, thyristor 26 will begin to conduct. As described above, a positive voltage through taps 20 to 19 will be applied from cathode to anode of conducting thyristor 28 when thyristor 26 is turned on. Thus thyristor 28 is turned off and the voltage of tap 20 through 19 is applied to winding 33 of a polarity opposed to that applied from tap 21 through 20. This added voltage produces a boost potential in the secondary winding 15 of transformer 14. Dotted wave form 122 of FIG. 4a represents the electrical output wave form where thyristor 26 would be fired very early after each zero crossing by firing thyristors 30, 28 and 26 in a rapid sequence.

FIGS. 4c and 4d depict the operation of the regulator system wherein the thyristors of thyristor set 24 are fired at approximately zero degrees, the thyristors of thyristor set 23 are fired at 60 degrees and the thyristors of thyristor set 22 are fired at approximately 120 degrees after a zero crossing. Point 125 represents a firing of thyristor 30 on a positive half cycle at approximately zero degrees. Point 126 represents the firing of thyristor 28 on a positive half cycle, at approximately 60 degrees and point 127 represents the firing of thyristor 26 at approximately 120 degrees on a positive half cycle. Point 128 represents the firing of thyristor 31 at the start of the negative going half cycle and point 129 and 130 represent the firing of thyristors 29 and 27 respectively on the negative going half cycle in 60 degree increments. FIG. 4d effectively shows the buck and boost current relationships in the primary winding 33 of transformer 14. Portion 131 represents the buck potential in primary winding 33 of transformer 14 when the thyristor 30 of thyristor 24 set is fired. Portion 132 represents a zero boost or buck condition when thyristor 28 of thyristor set 23 is fired and portion 133 represents a boost potential when thyristor 26 of thyristor set 22 is fired.

The operation of the invention shown in FIG. 2 is very similar to that of FIG. 1 described above. However, in FIG. 2 a step-down transformer 46 is provided in order to enable the operation of the regulator system in a high voltage-low current system. The voltage across the input terminals 40 and 41 is stepped down by transformer 46 to provide a lower potential across the secondary winding 48. This arrangement therefore allows the use of thyristors of the same rating as used in FIG. 1 in order to provide the same kilovolt amperes of regulation to a load operating at a higher voltage and lower current rating.

FIG. 3 also operates substantially identical to the operation described for the embodiment of FIG. 1. A step-up transformer 76 is used to enable the system to provide the same kilovolt ampere regulation in a low voltage-high current system. A step-up transformer 76 steps up the voltage applied across terminals 70 and 71 to provide a higher voltage across secondary winding 78. Thyristors in FIG. 3 are the same rating as those in FIG. 1 and provide the same amount of power regulation to the low voltage load connected across terminals 72 and 73. An autotransformer 74 is used to provide a step-down in voltage and step-up of current to the load connected across terminals 72 and 73.

Figure 5:
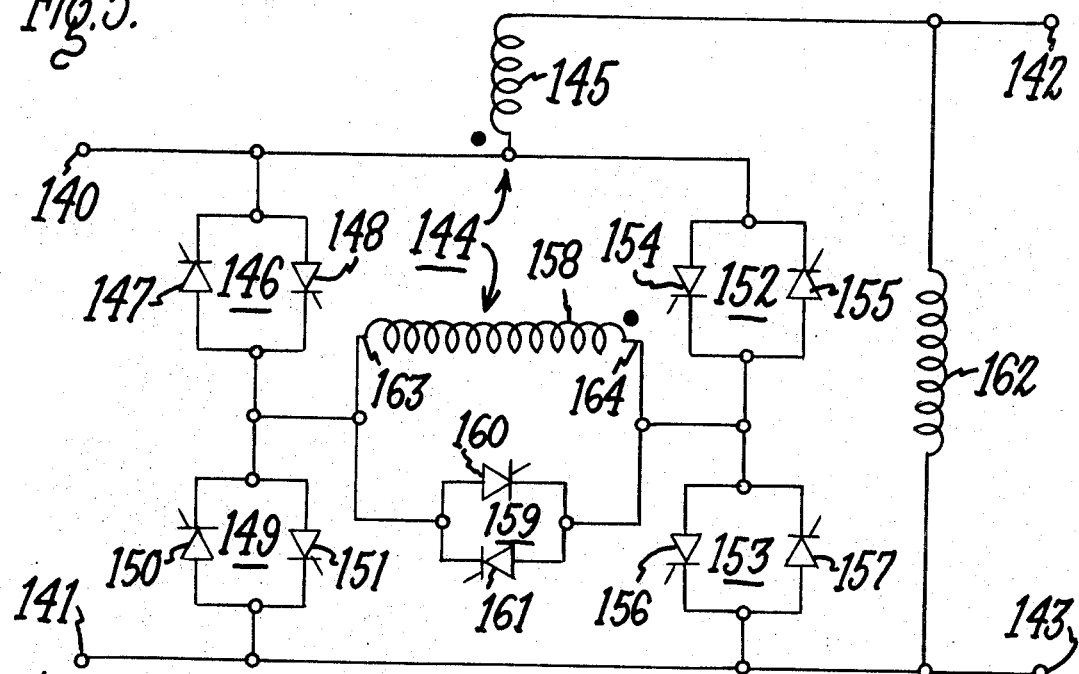
FIG. 5 and FIG. 6 show two additional embodiments of the invention.

Referring now to FIG. 5, terminals 140 and 141 are input terminals across which a source of alternating current is applied. The load requiring the regulated alternating voltage is connected across terminals 142 and 143. Secondary winding 145 of transformer 144 is connected in series with the line between terminals 140 and 142.

Thyristor set 146, comprised of inverse parallel connected thyristors 147 and 148, and thyristor set 149, comprised of inverse parallel connected thyristors 150 and 151, are connected across input terminals 140 and 141. Thyristor sets 152 and 153 are also connected in series across the input terminals 140 and 141. Thyristor sets 152 and 153 are comprised of inverse parallel connected thyristors 154, 155, and 156, 157, respectively. Primary winding 158 of transformer 144 is connected between the junction of thyristor sets 146 and 149 and the junction of thyristor sets 152 and 153. Thyristor set 159 comprised of thyristors 160 and 161 is connected across primary winding 158. An inductance 162 is connected across output terminals 142 and 143 to balance out the magnetizing current of transformer 144. Inductance 162 eliminates a lagging effect by cancelling the magnetizing current in the primary winding 158 of transformer 144 thereby making the voltage zero coincide with the current zero. This is desirable because conventional thyristors such as silicon controlled rectifiers do not turn off until the current goes to zero even though the voltage may have previously gone through zero.

In the operation of FIG. 5, a source of alternating voltage is supplied across terminals 140 and 141 and a load requiring the regulated voltage is connected across terminals 142 and 143. The current flowing through secondary winding 145 of transformer 144 induces a voltage in the primary winding 158 which may be 10 times the voltage dropped across secondary winding 145 and many times the voltage of the source. Thus, for a positive half cycle the dotted terminal of secondary winding 145 and the dotted terminal of primary winding 158 will be at a positive potential with respect to the other terminals of the windings, respectively. In order to produce a buck condition as shown by wave form 121 in FIG. 4a, thyristor 150 of thyristor set 149 and thyristor 155 of thyristor set 152 would be fired. It may be noted that thyristors 150 and 155 may be fired due to a large negative to positive potential drop from terminal 163 to terminal 164 of primary winding 158. By following a path around a closed loop comprised of terminal 163 to terminal 164 of primary winding 158 through thyristor 155, through terminal 140, through the source voltage from positive to negative, through terminal 141 and thyristor 150 back to terminal 163 of primary winding 158, it is apparent that a voltage of the proper polarity exists for turning on thyristors 150 and 155. When conducting, the source is then connected across terminals 164 and 163 of winding 144 and thus produces a bucking voltage in secondary winding 145 of transformer 144. For a zero buck or boost condition as shown by wave form 120 in FIG. 4a, thyristor 161 of thyristor set 159 would be fired. The firing of thyristor 161 short circuits primary winding 158 and causes thyristors 155 and 150 to be commutated by the source voltage. Any induced voltage across primary winding 158 is removed from thyristors 150 and 155, permitting the negative to positive voltage from terminal 141 to 140 from the alternating current source is applied across these thyristors in the reverse direction thereby causing them to cease conduction. For a maximum boost condition as shown by wave form 122 on FIG. 4a, thyristor 148 of thyristor set 146 and thyristor 156 of thyristor set 153 would be fired. The firing of thyristors 148 and 156 causes thyristor 161 to be commutated or reverse biased and turned off and applies the source of alternating current connected across terminals 140 and 141 in aiding polarity with the induced voltage in primary winding 158. For the positive half cycle, this may be similarly traced around a closed loop comprising terminal 163 to terminal 164 of primary winding 158, through thyristor 156 through terminal 141, through the alternating current source and terminal 140 back through thyristor 148 to terminal 163 of primary winding 158. It is seen that on the positive half cycle the alternating current source voltage is added to the negative to positive voltage across primary winding 158 from terminal 163 to 164.

On a negative half cycle, a bucking condition would be created by firing thyristor 151 of thyristor set 149 and thyristor 154 of thyristor set 152. In order to commutate thyristors 151 and 154 and produce a zero buck or boost condition, thyristor 160 would be fired. In order to create a boost condition on the negative half cycle, thyristor 147 of thyristor set 146 and thyristor 157 of thyristor set 153 would be fired. Similar to the operation of FIG. 1, the appropriate thyristors of thyristor sets 149 and 152 are fired shortly after a zero crossing in each half cycle. The appropriate thyristor in thyristor set 159 may be fired immediately after the bucking thyristors sets if a zero boost or buck condition is desired or may be fired at any appropriate time during the half cycle. The appropriate thyristors in boosting thyristor sets 146 and 153 may be fired in each half cycle at an appropriate time depending upon the degree of boost required. As described in the operation of FIG. 1, the firing of the buck, zero buck or boost, and boost thyristor sets in sequence may be at any time during the half cycle in order to provide the amount of buck or boost required.

Figure 6:
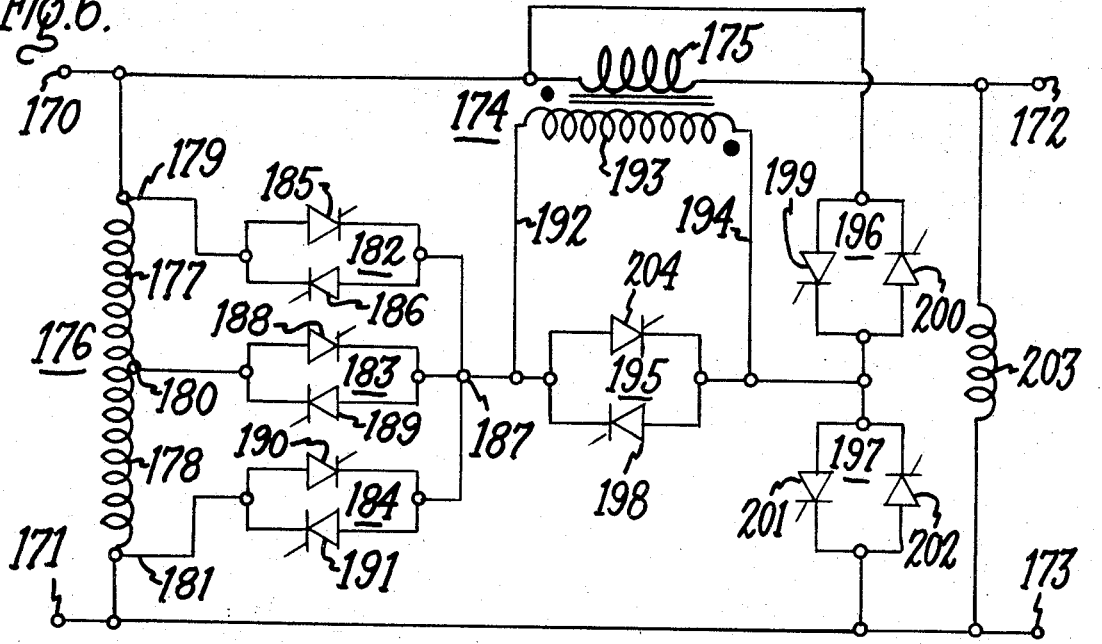

Referring now to FIG. 6, terminals 170 and 171 are input terminals across which a source of alternating voltage is applied. A load requiring the regulated alternating voltage is connected across terminals 172 and 173. A secondary winding 175 of transformer 174 is connected in series with the line between terminals 170 and 172.

A shunt transformer 176, comprised of windings 177 and 178 and having taps 179, 180 and 181, is connected across the input terminals 170 and 171. Thyristor set 182 comprised of inverse parallel connected thyristors 185 and 186 is connected between tap 179 and point 187. Thyristor set 183 comprised of inverse parallel connected thyristors 188 and 189 is connected between tap 180 and point 187. Thyristor set 184 comprised of inverse parallel connected thyristors 190 and 191 is connected between tap 181 and point 187. Thus one side of each of the thyristor sets 182–184 are connected together at point 187 which in turn is connected to terminal 192 of primary winding 193 of transformer 174. Terminal 194 of primary winding 193 is connected to the junction of thyristor sets 195, 196 and 197. Thyristor set 195 comprised of inverse parallel connected thyristors 198 and 204 is connected across terminals 192 and 194 of primary winding 193. Thyristor set 196, comprised of inverse parallel connected thyristors 199 and 200, and thyristor set 197 comprised of inverse parallel connected thyristors 201 and 202 are connected in series across input terminals 170 and 171. Terminal 194 of primary winding 193 is connected to the junction of thyristor sets 196 and 197. Inductance 203 is connected across terminals 172 and 173 to cancel the magnetizing current of primary winding 193 of transformer 174.

The embodiment shown in FIG. 6 provides five steps or five different voltage levels in order to provide low harmonic content in the regulated output. Thyristor sets 182–184 operate similarly to thyristor sets 22–24 of FIG. 1. During operation, a relatively large voltage is induced into primary winding 193 of transformer 174, for example 3 to 10 times the voltage drop across secondary winding 175 may be induced in the primary winding 193 depending upon the turns ratio. Thyristor set 195 is used to short the primary winding 193 to produce a zero boost, or buck condition. Thyristor set 196 is used in conjunction with the bucking mode of operation and thyristor set 197 is used in conjunction with the boosting mode of operation.

On a positive half cycle for a maximum buck condition, thyristor 190 of thyristor set 184 and thyristor 200 of thyristor set 196 would be fired. For a medium or half buck condition, thyristor 188 of thyristor set 183 would be triggered with thyristor 200 of thyristor set 196 remaining conductive. The firing of thyristor 188 would cause commutation of thyristor 190. For a zero regulation or a zero buck or boost condition, thyristor 198 of thyristor set 195 would be fired on the positive half cycle. The triggering or firing of thyristor 198 would commutate thyristors 188 and 200. The firing of thyristor 198 also short circuits primary winding 193 producing a zero amount of buck or boost in secondary winding 175. In order to produce a median or half level of boost on a positive half cycle, thyristor 188 of thyristor set 183 and thyristor 201 of thyristor set 197 are fired. In order to produce the maximum level of boost on the positive half cycle, thyristor 185 of thyristor set 182 is fired with thyristor 201 remaining conductive. The firing of thyristor 185 causes commutation of the prior conducting thyristor 188 as described above in conjunction with the description of FIG. 1. The firing of the other thyristor in each applicable thyristor set would produce the same amount of buck or boost on the negative half cycle. The circuit of FIG. 6 may also be modified as described in FIGS. 2 and 3 in order to adapt the embodiment to a high voltage-low current system or to a low voltage, high current system.

It will be apparent to those skilled in the art that the regulator circuits described herein may also be used to produce a variable output alternating voltage when a stable input alternating voltage is applied to the input terminals. It is also apparent that various changes and modifications may be made in the circuitry, or different devices used to produce the same function in the circuit. The selection of two levels of buck and boost in some embodiments is not intended to limit the scope of the invention. It is apparent that a single level of buck and boost or three or more levels of buck or boost may be used by adding additional sets of thyristors and providing proper alternating potentials. The selection of the number of levels of buck or boost is merely a trade off between an acceptable level of harmonic distortion in the output voltage and the cost of the components of the circuit.

In view of the above, it will be apparent that modifications and variations are possible within the scope and spirit of the above teachings. It, therefore, is to be understood that within the scope of the appended claims, the invention may be practiced other than as specifically described.

What is claimed as new and desired to be secured by Letters Patent of the United States is:

1. An electrical apparatus, comprising:
   an input terminal;
   an output terminal;
   a transformer having a primary and a secondary winding, said primary winding having a first and a second input terminal, said secondary winding being connected between said input and output terminals;
   a first and a second pair of inverse parallel connected thyristors connected in series between said input terminal and a common point;
   a third and a fourth pair of inverse parallel connected thyristors connected in series between said input terminal and said common point, said first terminal of said primary winding of said transformer being connected to the junction of said first and second pairs of inverse parallel connected thyristors and said second terminal of said primary winding being connected to the junction of said third and fourth pairs of inverse parallel connected thyristors;
   a fifth pair of inverse parallel connected thyristors connected between said first and second terminals of said primary winding of said transformer.

2. An electrical apparatus, comprising:
   an input terminal;
   an output terminal;
   a transformer having a primary and a secondary winding, said primary winding having a first and a second terminal, said secondary winding being connected between said input and output terminals;
   a plurality of inverse parallel connected pairs of thyristors, each of said inverse parallel connected pairs of thyristors being connected between said first terminal of said primary winding of said transformer and one of a plurality of electrical potentials of different magnitudes in an alternating potential system;
   a pair of inverse parallel connected pairs of thyristors connected to said second terminal of said primary winding of said transformer, the other end of one of said pairs of inverse parallel connected pairs of thyristors being connected to an electrical potential of larger magnitude and the other end of the other of said pair of inverse parallel connected pairs of thyristors being connected to an electrical potential of smaller magnitude;
   a single inverse parallel connected pair of thyristors connected between said first and second terminals of said primary winding of said transformer.

3. An electrical apparatus as recited in claim 2 wherein said plurality of electrical potentials of different magnitudes is provided by a shunt transformer having a plurality of taps.

4. An electrical apparatus as recited in claim 2 wherein said plurality of electrical potentials of different magnitudes is provided by a step-down transformer having a plurality of taps.

5. An electrical apparatus as recited in claim 2 wherein said plurality of electrical potentials of different magnitudes is provided by a step-down transformer having a primary and a secondary winding, said primary winding being connected to said input terminal and said secondary winding being provided with a plurality of taps, each of said taps being connected to a different one of said inverse parallel connected pairs of thyristors.

6. An electrical apparatus as recited in claim 2 wherein said plurality of electrical potentials of different magnitudes is provided by a step-up transformer having a primary and a secondary winding, said primary winding being connected to said input terminal and said secondary winding having a plurality of taps, each of said taps being connected to a different one of said inverse parallel connected pairs of thyristors.

* * * * *